UNITED STATES PATENT OFFICE.

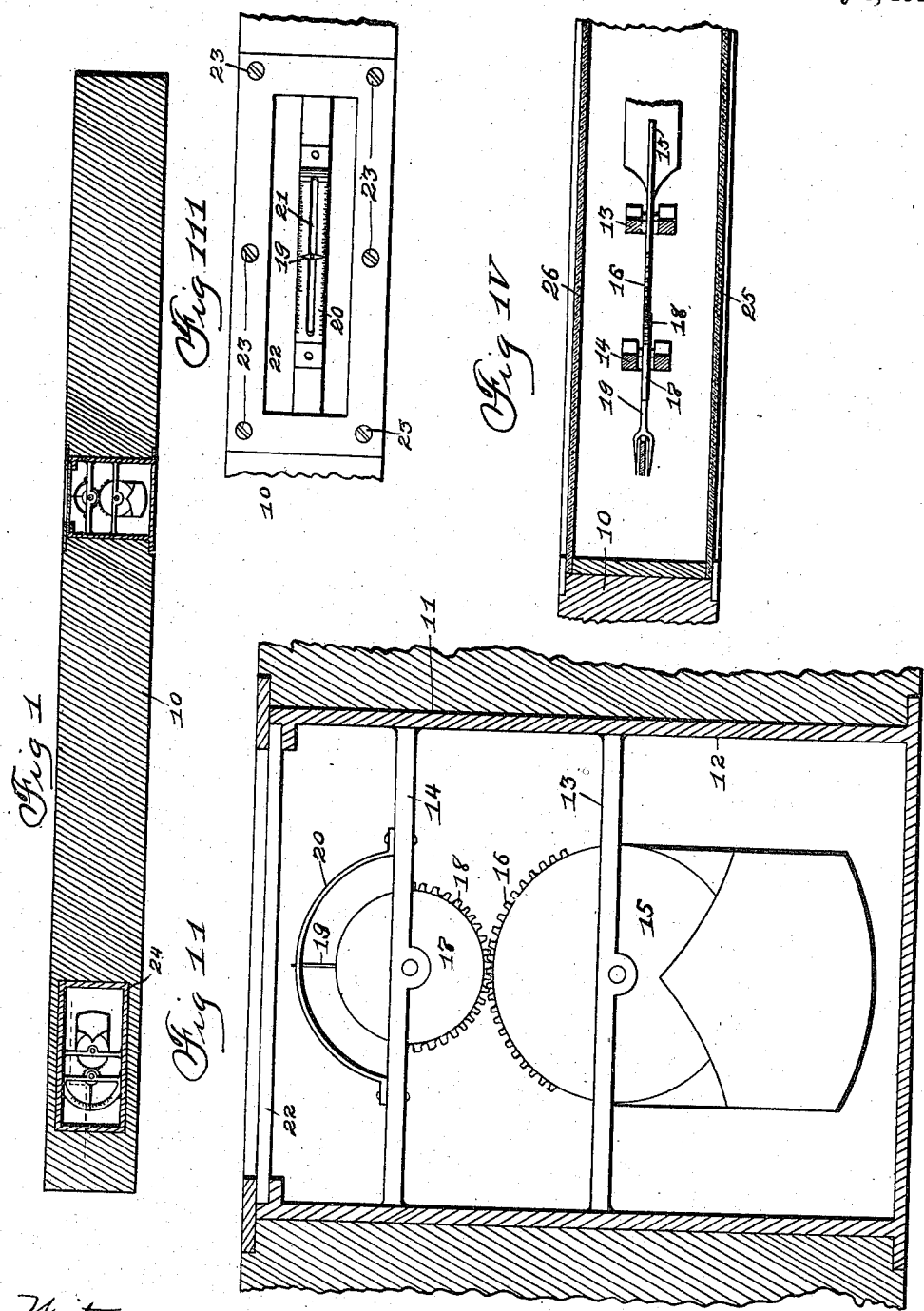

MARION A. WAGNER, OF DES MOINES, IOWA.

COMBINATION LEVEL AND PLUMB.

963,189.

Specification of Letters Patent. Patented July 5, 1910.

Application filed April 15, 1910. Serial No. 555,750.

*To all whom it may concern:*

Be it known that I, MARION A. WAGNER, a citizen of the United States, residing in Des Moines, county of Polk, and State of Iowa, have invented a new and useful Improvement in Combination Levels and Plumbs, of which the following is a specification.

The object of my invention is to provide a mechanically constructed combination level and plumb.

A further object is to provide such a device in a simple, strong, durable and inexpensive construction.

My invention consists of certain details of construction hereinafter set forth, pointed out in my claim and illustrated in the accompanying drawings, in which—

Figure I shows a longitudinal sectional view of my device; Fig. II shows a plan view in detail of the portion of my device constituting the level; Fig. III shows a detail view of the same; and Fig. IV shows a sectional view of that portion of my device which constitutes the plumb.

Referring to the accompanying drawings the reference numeral 10 is used to indicate the block of wood, or metal, as the case may be, which constitutes the level, provided with a pocket 11 in which the operating device for the level is designed to be mounted. This operating device is composed of a frame 12, designed to fit flush within the said pocket, provided with two cross bars 13 and 14, respectively, said cross bars being parallel to each other and mounted one above the other. Secured, for rotary movement, to the central portion of the cross bar 13 is a wheel 15 provided, on a part of its periphery with gear teeth 16 and the numeral 17 indicates a second gear wheel mounted, for rotary movement, on the cross bar 14, the mountings of the two wheels being in vertical alinement with each other, when the level is resting in a horizontal plane. The wheel 17 is provided on a part of its periphery with a series of gear teeth 18 and at that point of its periphery which is equidistant from the ends of the gear teeth with an outwardly projecting indicating needle 19.

The numeral 20 indicates a semi-circular scale bar provided with a longitudinal slot 21 through which the needle 19 projects, said scale bar being secured to the cross bar 14 in the manner shown. The wheels 15 and 17 are designed to mesh, as shown, and are so connected that, when the level is on a horizontal plane, the indicating needle 19 is pointing straight upward in a vertical line, as shown, in Fig. II. The wheel 15 is weighted, on its lower side, as shown, and, it is obvious, that the raising of either end of the level will cause the needle to oscillate, or move, in the reverse direction.

The numeral 22 indicates a glass top to the operating mechanism, said top being counter-sunk in the frame 12, as shown in Fig. II. The frame 12 is projected through the level from the base and is retained in position by the screws 23.

Near one end of the level, I have provided an orifice 24, in which the operating mechanism for the plumb is secured, but as this mechanism is exactly similar to the operating mechanism for the level, I will not again describe the same, except to state, that the scale I employ is marked on each side thereof and the operating needle is forked, so that it extends on each side of the scale and can be read from either side thereof. This is clearly shown in Fig. IV. I have provided glass fronts 25 and 26 for each side of the level so that the plumb scale may be, as before stated, easily read from either side.

Having thus described my invention what I claim and desire to secure by Letters Patent of the United States is:

A combination level and plumb comprising in combination a level, provided with one vertical orifice and one horizontal orifice; a frame fitted within the said vertical orifice; cross bars in said frame in different horizontal planes; a weighted wheel, provided with a series of gear teeth, mounted, for rotary movement, on the lower cross bar; a wheel, provided with a series of gear teeth and an outwardly extending needle, mounted, for rotary movement, on the upper cross bar, said wheels being in mesh with each other; a semi-circular indicating scale mounted on said upper cross bar; a transparent cover for said frame; a second frame, provided with two cross bars, and secured in the transverse orifice; a weighted wheel, provided with a series of gear teeth, mounted for rotary movement on the lower cross bar; a wheel, provided with a series of gear teeth and an indicating needle mounted, for rotary movement, on the upper cross bar, said wheels being in mesh with each other; a semi-circular indicating scale secured to the upper cross-bar; and transparent covers for each side of the said frame.

MARION A. WAGNER.

Witnesses:
B. M. SEDGWICK,
JOHN T. CONROY.